Dec. 4. 1951        F. B. MILLER        2,577,258
ALTERNATING CURRENT WELDER
Filed June 13, 1946        2 SHEETS—SHEET 1
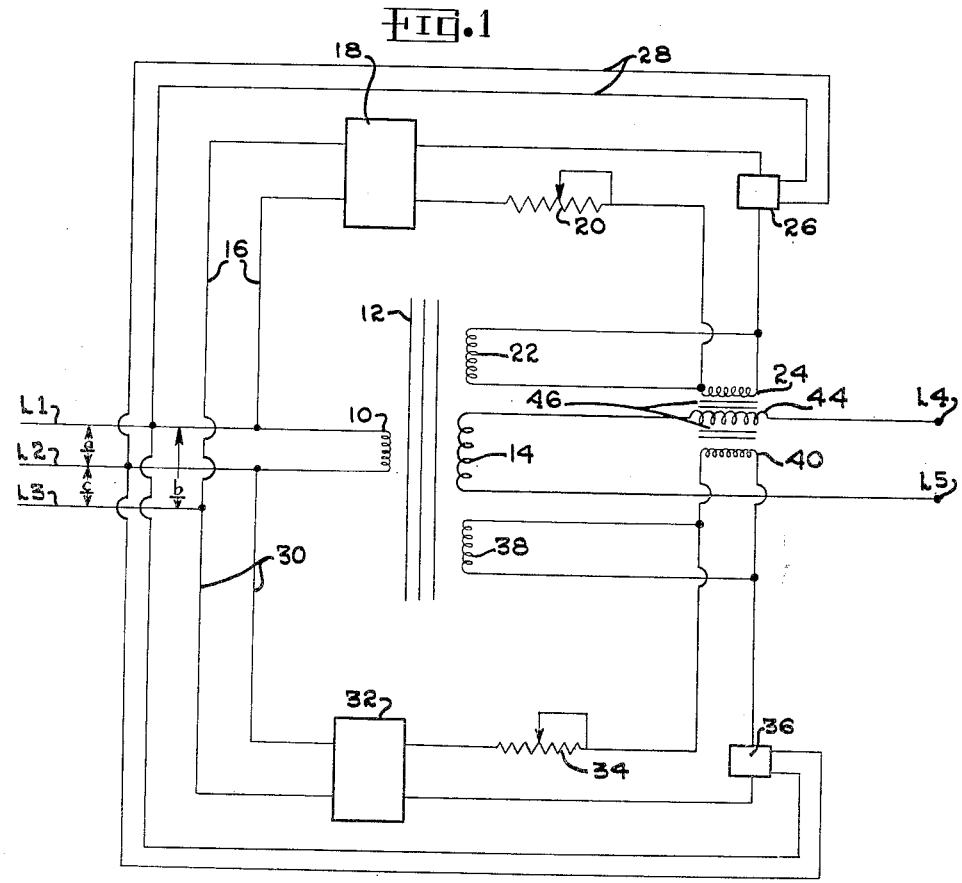
INVENTOR
FRANCIS B. MILLER
BY
Toulmin & Toulmin
ATTORNEYS Dec. 4, 1951 F. B. MILLER 2,577,258
ALTERNATING CURRENT WELDER
Filed June 13, 1946 2 SHEETS—SHEET 2
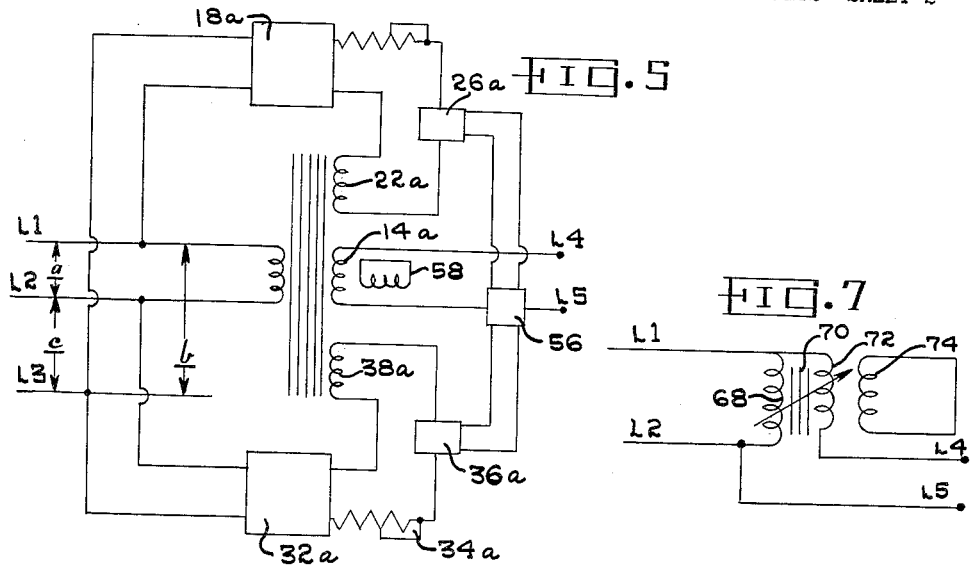
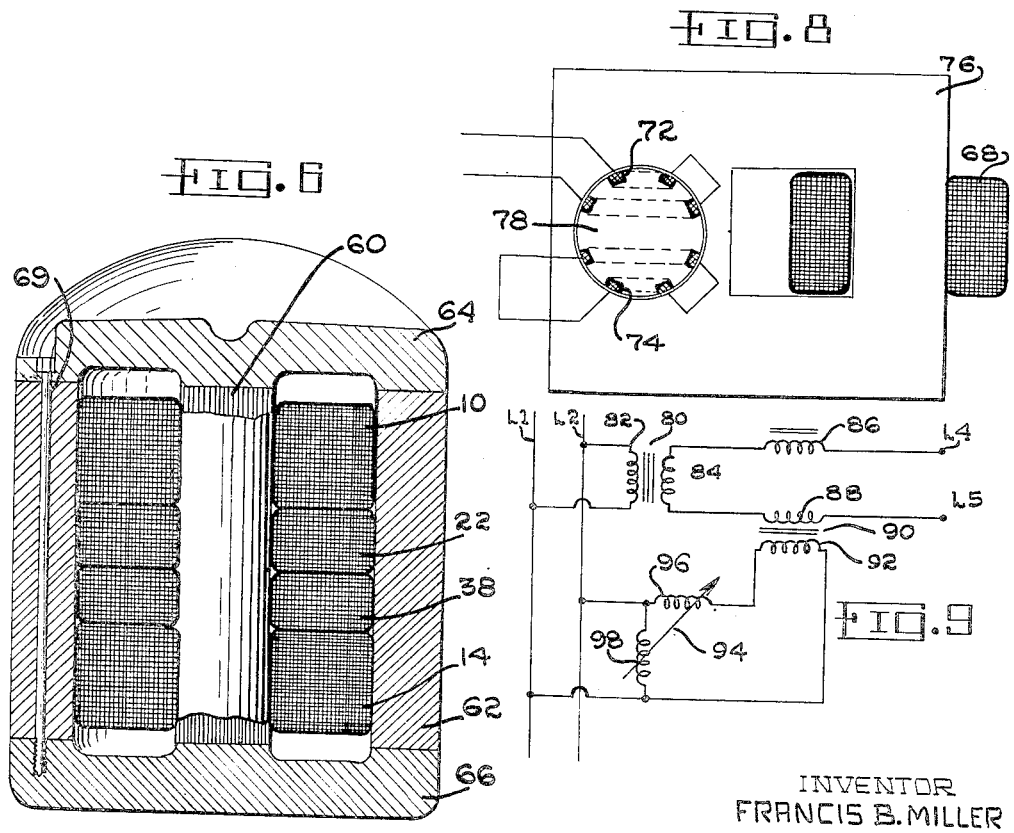
INVENTOR
FRANCIS B. MILLER
BY
Toulmin & Toulmin
ATTORNEYS Patented Dec. 4, 1951

2,577,258

UNITED STATES PATENT OFFICE 2,577,258

ALTERNATING-CURRENT WELDER

Francis B. Miller, Dayton, Ohio, assignor to The Commonwealth Engineering Company of Ohio, Dayton, Ohio, a corporation of Ohio Application June 13, 1946, Serial No. 676,407

4 Claims. (Cl. 321—57)

This invention relates to welding apparatus and to methods of welding and in particular to methods and apparatus for electric arc welding.

The object of this invention is to provide an improved alternating current arc welder having a more stable arc than has heretofore been possible.

It is another object to provide an alternating current arc welding transformer which tends to maintain a stable arc by imposing a high voltage across the arc when the welding current drops to zero.

It is still another object to provide a welding transformer according to the foregoing objects which employs a multi-phase input circuit for a single phase output circuit.

It is still another object to provide a welding transformer having quick recovery characteristics and which is variable in output.

It is still another object to provide a welding transformer having the above mentioned characteristics and which employs the principle of the auto-transformer for obtaining these characteristics.

Another object is to provide a method of transforming multi-phase current into single phase by transforming one of the input phases directly and storing the power input of the other phases to be applied in synchronism with the said one phase for producing an integrated single phase output.

Another object is to provide transformers according to the foregoing objects which include compensating winding for reducing the impedance of the circuits whereby large short circuit currents will flow for producing the high voltage required for the quick recovery of the secondary circuit following a short circuit.

These and other objects and advantages will become more apparent upon reference to the following description taken in connection with the attached drawings in which:

Figure 1 is a circuit diagram of a welding transformer for transforming three phase into single phase;

Figure 2 is a view showing a rectifier and power storage means which may be utilized in the circuit of Figure 1;

Figure 3 illustrates one form of relay which may be utilized in the circuit of Figure 1;

Figure 4 illustrates a portion of the circuit of Figure 1;

Figure 5 is a view showing a modified arrangement of the circuit of Figure 1;

Figure 6 is a perspective view, partly in section, showing one arrangement of the transformers of Figures 1 and 5;

Figure 7 is a view illustrating an auto-transformer type of welding transformer adapted for practicing this invention, and Figure 8 is a view illustrating the physical arrangement of a transformer constructed according to the diagram of Figure 7;

Figure 9 is a circuiting diagram of still another welding transformer according to this invention.

Referring to the drawings, and in particular Figure 1, the primary leads are indicated at L1, L2 and L3 and may form a three phase circuit which can be, for example, at 220 volts and at a frequency of 60 cycles per second.

The leads L1 and L2 form a phase $a$ which is connected to the terminals of a primary coil at 10 which is arranged in magnetic association with the transformer core 12.

The secondary of the transformer is indicated at 14 and has its terminals connected with the output terminals at L4 and L5. The voltage applied to the output terminals preferably ranges from 75 or 80 volts downwardly according to the particular work to be welded.

The lines L1 and L3 form a phase $b$ which is connected by a pair of wires 16 to a rectifier and filter at 18. The output from the filter 18 is conducted through a variable resistor 20 to one terminal of a pair of coils 22 and 24, the other terminals of which are connected to one side of a relay 26. The other side of the relay 26 is connected to the other output terminal of the filter 18.

The relay 26 may be of any of several well-known types and is connected by a pair of wires 28 with the phase $a$ to be operated into its closed position in accordance with predetermined electrical conditions in phase $a$.

The coil 22 is associated with the transformer core 12 in such a manner that the lines of magnetic flux established by the said coil will add to those established by the coil 10.

The lines L2 and L3 form the phase $c$ which is connected by the wires 30 with a second filter unit 32. The filter unit is, in turn, connected through a resistor 34 and a relay 36 with the coils 38 and 40 which correspond, respectively, with the coils 22 and 24. The relay 36 is, like the relay 26, operated from phase $a$ by the wires 42.

The coils 24 and 40 are wound together with a coil 44 in the secondary circuit on a core 46. The coils are wound additively and thus form a high intensity choke, the principal function of which is to provide for the quick recovery of the secondary voltage following the breaking of a secondary short circuit.

In Figure 2 there is illustrated a typical filter which may be employed at 18 and 32 and which comprises the chokes 48 and the condensers 50 arranged in the usual manner. The condenser 50 adjacent the output terminals of the filter stores a predetermined charge which is delivered to one of the coils 22, 38 when the associated relay is operated. By providing filters having different delay characteristics, it is possible to store power from a plurality of phases and thereafter to apply the same in phase with a master phase to the primary of a transformer, all of the phases adding to the primary flux in the transformer core.

Figure 3 illustrates one form of relay which may be employed at 26 or 36 and comprises a pair of electronic tubes 52 and 54 which are adapted for passing current in respectively opposite directions. The tube 52 may be triggered by the grid 53 thereof while the grid 54 may be triggered by the grid 55 from the phase a in accordance with any predetermined stimulant. The charge stored on the associated condenser 50 is thus applied to the associated coil 32, 38 in the proper direction and time relationship to add to the coil 10.

There is illustrated in Figure 4 one arrangement that the coils 24, 40 and 44 and the core 46 may take. It will be seen that this portion of the circuit consists of a multi coil iron core choke.

In Figure 5 there is shown an arrangement similar to that of Figure 1 in which similar parts are identified by the same numerals with an addition of a subscript a except for the input and output leads and the primary phases.

In Figure 5 the filters 18a and 32a are adapted for being connected to their respective transformer coils 22a and 38a by the relays 26a and 36a respectively. The relays are operated by a current relay 56 connected in one of the output leads so that the relays 26a and 36a are operated at or near the point where the secondary current passes through zero.

The circuit of Figure 5 also includes a compensating coil at 58 which is magnetically linked with a secondary coil 14a in such a manner as to reduce its impedance. The secondary circuit may also include the choke shown in the secondary circuit of Figure 1 as desired.

Both of the transformers of Figures 1 and 5, are of the low leakage reactance or closely coupled type. Transformers of this type have high short circuit current characteristics and are thus adapted for the maintenance of a stable arc. Also, with high short circuit currents, the energy stored in the choke is high and, when the short is interrupted, a high arc restoring voltage is applied to the output terminals.

During welding an arc is struck between the workpiece and the welding rod by touching the two together and the arc is thereafter maintained with the rod and workpiece spaced apart.

As welding continues, the rod melts and drops thereof pass across the arc space and fuse with the metal of the workpiece. It has been found that the drops so passed tend to stretch out to bridge the gap between the rod and the workpiece and thereby place a short circuit on the secondary side of the transformer. This short circuit is momentary and is broken as soon as the drop leaves the rod. By employing transformers constructed according to this invention, there is a high surge of current to carry the drop across the gap into position on the workpiece while the voltage "kick" set up by the choke in the secondary assists in quickly reestablishing the arc. Thus, very stable and improved arc characteristics result.

In Figure 6 there is illustrated one method of building a transformer according to the circuits of Figures 1 and 5. In this view there is a core at 60 which is preferably of a good grade of transformer lamination steel and may be rolled up from a sheet. Arranged around the core 60 is the primary coil 10, the secondary coil 14 and the auxiliary saturating coils 22 and 38. Arranged around the coils is a shell 62 which is also preferably formed from a strip of high grade transformer steel. The core 60 and shell 62 are magnetically connected and structurally supported by the upper cast yoke 64 and the lower cast foot 66. Bolts 69 may be provided for clamping the entire assembly rigidly together.

In Figure 7 there is shown the auto-transformer type wherein the primary leads L1 and L2 are connected with the opposite ends of a primary coil 68. The coil 68 is variably coupled on a core 70 with a secondary 72, one end of which is connected with the lead L1.

Rigidly magnetically coupled with a secondary 72 is a short circuited compensating winding 74 which is for the purpose of reducing the impedance of the secondary 72.

The other terminal of the secondary 72 is connected with the output terminal L4 while the other output terminal L5 is connected with the primary lead L2.

By varying the coupling of coils 72 and 68 the output voltage and current may be varied within a wide range and the output will have the characteristics provided for in this invention. That is, a high short circuit current and a quick recover of welding voltage following a short circuit.

The physical arrangement of the circuit shown in Figure 7 is illustrated in Figure 8 wherein the primary 68 is wound on one leg of a core 76 which is apertured in one of the other legs for receiving a cylindrical magnetic member 78. The member 78 has wound on one side thereof a coil 72 and on the other side thereof a coil 74. By rotating the member 78, the coupling between the coils 72 and 68 may be varied.

As in the case of the transformers shown on Figures 1 and 5, the transformer of Figures 7 and 8 is closely coupled, having low leakage reactance. Thus, in each case the transformer has a high short circuit current and a relatively high recovery voltage. Also, because of the close coupling the power factors at which these transformers operate is exceptionally high.

Of particular advantage in many instances is the arrangement of this invention whereby a plurality of phases are employed to produce a single phase. By thus dividing the welding load over several phases, no one phase is overloaded, smaller wiring may be used, and fewer precautions need be taken to maintain the proper line voltage in other parts of the primary circuit.

In Figure 9 there is shown a first transformer at 80 having a primary 82 supplied from the power lines L1 and L2 and a secondary 84 whose opposite ends are connected with the output terminals L4 and L5.

Serially connected with the secondary 84 is an iron core choke 86 and a secondary 88 of a second transformer 90. The secondary 88 is variably energized from the primary 92 of the transformer which is connected with an adjustable source of power at 94 which consists of a regulator or variator having the coils 96 and 98 which are connected to receive power from the lines L1 and L2.

In operation, the voltage supply of the coil 88 may be arranged to add to or to subtract from the voltage of the coil 84 to vary the volt-ampere characteristics of the output.

The transformers 86 and 90 are closely coupled so that high short circuits flow and thus there is a high recover voltage available when the short circuit is eliminated. The choke at 86 contributes to the recovery voltage as well as the transformers.

It will be understood that I desire to comprehend within my invention such modifications as come within the scope of the claims and the invention.

I claim:

1. In a welding transformer; a primary and a secondary coil and a single closed magnetic circuit linking said coils; a three phase power supply system having one phase thereof connected to supply said primary coil; first and second auxiliary coils positioned to be linked by said magnetic circuit; and first and second filters connected respectively to supply said first and second auxiliary coils, said first and second filters being supplied respectively by the second and third phases of said power supply circuit.

2. In a transformer for converting a multi-phase power input to a single phase power output the combination of; a transformer core providing a single closed magnetic circuit; a primary and a secondary coil on said core magnetically associated, the said primary being supplied from one of the phases of said power supply circuit; a filter connected to be supplied by each of the other of the phases of said power supply; coils on said core magnetically associated with said primary and secondary coils and connected to be supplied by each of said filters; and switch means operable to bring about the supply from said filters to sail coils in unison with the supply of power to said primary coil.

3. An apparatus for distributing a single phase load over the several phases of a multi-phase supply circuit comprising; a transformer having a secondary coil connected with said load and a primary coil connected with one phase of said supply; a plurality of auxiliary primary coils each connected through a filter with one of the other phases of said supply; and relay means operated from said one phase for causing the supply from said filters to said auxiliary coils in unison with the supply from said one phase to said primary coil whereby all of said phases contribute to the magnetization of the magnetic circuit of said transformer, said primary, secondary and auxiliary coils being linked together by a single closed magnetic circuit.

4. A welding transformer comprising a core and a closely coupled primary coil and a secondary coil; a pair of auxiliary primary coils on said core coupled with said secondary coil by the same magnetic circuit as said first mentioned primary coil; power supply means comprising a three phase circuit connected simultaneously to supply power to said primary coils for additively magnetizing the core of the transformer; choke means in the secondary circuit of said transformer and means connected with said auxiliary coils for increasing the inductive effect of said choke.

FRANCIS B. MILLER.

REFERENCES CITED

The following references are of record in the file of this patent:

UNITED STATES PATENTS

| Number | Name | Date |
|---|---|---|
| Re. 12,223 | Hutin et al. | May 24, 1904 |
| 519,376 | Bradley | May 8, 1894 |
| 620,283 | Cowan et al. | Feb. 28, 1899 |
| 732,204 | Lunt | June 30, 1903 |
| 861,031 | Harden | July 23, 1907 |
| 905,930 | Russell et al. | Dec. 8, 1908 |
| 1,852,651 | Hansell | Apr. 5, 1932 |
| 2,001,465 | Klinkhamer | May 14, 1935 |
| 2,220,126 | Six et al. | Nov. 5, 1940 |
| 2,253,053 | Stevens et al. | Aug. 19, 1941 |
| 2,324,822 | Champlin | July 20, 1943 |
| 2,359,768 | Kiltie | Oct. 10, 1944 |